United States Patent Office 3,235,606
Patented Feb. 15, 1966

3,235,606
PROCESS FOR THE PRODUCTION OF NOVEL CYCLOPENTENYLCYCLOPENTENYL ETHERS
Erich Marcus and John T. Fitzpatrick, Charleston, W. Va., assignors to Union Carbide Corporation, a corporation of New York
No Drawing. Filed July 6, 1961, Ser. No. 122,067
7 Claims. (Cl. 260—611)

This invention relates to a novel process for the production of cyclopentenylcyclopentenyl ethers by the reaction of a monoepoxide with a cyclopentenylcyclopentenyl halide.

In another aspect, this invention relates to novel cyclopentenylcyclopentenyl ethers.

The novel process of this invention is carried out by reacting a cyclopentenylcyclopentenyl halide with a monoepoxide in the presence of a Friedel-Crafts catalyst.

The cyclopentenylcyclopentenyl halides which are useful in the novel process of this invention are isomeric mixtures which have been described in a copending application Ser. No. 54,579, filed September 8, 1960, by Tinsley et al., and now abandoned. One isomeric form of said cyclopentenylcyclopentenyl halides can be represented by the following formula:

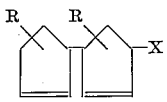

where R represents hydrogen or an alkyl group of from 1 to 8 carbon atoms and X represents chlorine or bromine.

The cyclopentenylcyclopentenyl halides can be prepared by reacting a halocyclopentene of the formula:

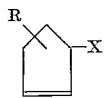

with a cyclopentadiene of the formula:

wherein X and R have the same meaning as previously set forth in the presence of a Friedel-Crafts catalyst.

Examples of cyclopentenylcyclopentenyl halides which are useful in the novel process of this invention include cyclopentenylcyclopentenyl chloride, cyclopentenylcyclopentenyl bromide, methylcyclopentenylethylcyclopentenyl chloride, butylcyclopentenylbutylcyclopentenyl bromide, etc. It is to be pointed out that the number and position of the alkyl group of the cyclopentenyl ring is far from being critical and every combination as well as mixtures is contemplated herein.

The monoepoxides which can be used in the novel process of this invention can be represented by the following general formula:

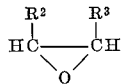

wherein $R^2$ individually represents hydrogen, alkyl groups of from 1-8 carbon atoms, haloalkyl groups wherein the alkyl group has from 1-8 carbon atoms, vinyl and phenyl; $R^3$ individually represents hydrogen, $R^2$ and $R^3$ taken together may represent alkylene groups such as trimethylene or tetramethylene. Illustrative of the epoxides which can be used in the novel process of this invention are ethylene oxide, propylene oxide, styrene oxide, epichlorohydrin, butadiene monoxide, cyclohexene oxide and cyclopentene oxide.

As has heretofore been pointed out, the novel process of our invention is carried out by reacting a monoepoxide with a cyclopentenylcyclopentenyl halide in the presence of a Friedel-Crafts catalyst. As examples of Friedel-Crafts catalysts which are operable, one can include zinc chloride, mercuric chloride, zinc bromide, stannic chloride, aluminum chloride and boron trifluoride. The preferred catalyst is zinc chloride. The amount of catalyst employed is not narrowly critical and can vary over a wide range. Catalyst concentrations as low as 0.01 of a percent to as high as 10 percent by weight based on the amount of cyclopentenylcyclopentenyl halide are operable. However, it is preferred to employ 0.05 to 2 percent by weight based on the weight of cyclopentenylcyclopentenyl halide.

The temperature at which the process is carried out is also not narrowly critical and temperatures of from —80 to +80° C. are operable. However, it is preferred to conduct the process at temperatures in the range of —40 to +40° C.

The molar ratio of the epoxide to the cyclopentenylcyclopentenyl halide is far from being critical and an excess of either can be employed. For economical considerations, it is preferred to employ a 1:1 molar ratio.

The order of addition of reactants is also not critical and is a matter of choice but it is preferred to gradually add one reactant to the other since the progress of the reaction can be better controlled. It is also pointed out that a solvent is not necessary, although any solvent which is inert t othe reactants and reaction product under the conditions specified can be employed. Examples of such solvents include petroleum ether, ethyl ether, chloroform, benzene and ethyl acetate.

In another aspect, this invention relates to novel cyclopentenylcyclopentenyl ethers which are products resulting from the novel process of this invention. At the outset, it is pointed out that the novel cyclopentenylcyclopentenyl ethers are mixtures of various isomeric forms, the complete nature of which, or the distribution of which, in the product has not been completely determined.

In order to aid in understanding the various products which can result from the novel process of this invention, the following formulas are presented:

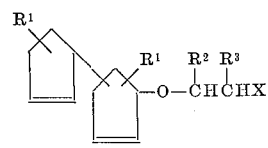

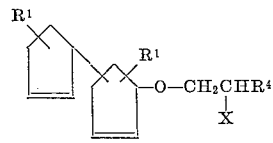

wherein $R^1$ represents hydrogen and an alkyl of from 1–8 carbon atoms; $R^2$ individually represents hydrogen, an alkyl of from 1–8 carbon atoms and haloalkyl groups of from 1–8 carbon atoms; $R^3$ individually represents hydrogen; $R^2$ and $R^3$ taken together represent alkylene groups such as trimethylene and tetra methylene; $R^4$ represents vinyl or phenyl; and X represents chlorine or bromine.

It is to be understood that the above formulas are intended to represent the main isomeric products resulting from the novel process of this invention.

The isolation of the various mixtures of the cyclopentenylcylopentyl ethers from the reaction mixture can be accomplished in a variety of ways. The catalyst can be removed by washing the reaction mixture with water. Alternatively, the reaction product may be subjected to vacuum distillation without washing. It is to be pointed out that the reaction mixture can be used per se without any isolation.

The novel cyclopentenylcyclopentenyl ethers of this invention are useful in the same manner as ordinary, simple ethers. Thus, they can be used as solvents, paint thinners and as intermediates for the preparation of a wide variety of compounds containing cyclopentenyl rings. It is to be pointed out that the utility of these ethers applies to the isometric mixtures as well as the pure compound.

The following example will illustrate the novel process of this invention.

*Di(cyclopentenyl) 2-chloroethyl ether*

Cyclopentadiene (528 grams, 8.0 mols) was added during a period of two hours with stirring to a mixture of 3-chlorocyclopentene (820 grams, 8.0 mols) and pulverized zinc chloride (0.8 gram), while the temperature was maintained at 0° C. The mixture was stirred for an additional two hours at 0° C. The crude cyclopentylchlorocyclopentene was used for the further reaction with ethylene oxide in this form.

Ethylene oxide (352 grams, 8.0 mols) was added during a period of one hour with stirring to the crude cyclopentenylchlorocyclopentene while the temperature was maintained at 0° C. The mixture was stirred for an additional hour at the same temperature. After addition of petroleum ether (B.P 35–37°, 500 ml.), the reaction product was washed with water, dried over calcium chloride, and distilled through a 10″ long column packed with glass helices. The following fractions were obtained after removal of solvent.

| Fraction | B.P. in °C. | Pressure in mm. | Weight in Grams | Yield in percent | n 20/D | $d_4^{20}$ |
|---|---|---|---|---|---|---|
| 1 | 76–102 | 1.0–0.6 | 33 | 2 | | |
| 2 | 102–110 | 0.9 | 35 | 2 | | |
| 3 | 110–117 | 0.9 | 1071 | 63 | 1.5034 | 1.068 |
| 4 a | 150–160 | 0.15 | 148 | 13 | } b 1.5217 | b 1.073 |
| 5 a | 160–175 | 0.15–0.7 | 97 | 9 | | |
| Residue | | | 80 | | | | a Distilled without rectification.
b Fractions 4 and 5 combined.

Fraction 3 analyzed as follows:

ANALYSIS FOR $C_{12}H_{17}OCl$

| | C | H | Cl | $M_D$ |
|---|---|---|---|---|
| Calculated | 67.76 | 8.00 | 16.71 | 58.80 |
| Found | 67.37 | 8.09 | 16.87 | 58.9 |

What is claimed is:

1. The process for the production of cyclopentenylcyclopentenyl ethers which comprises reacting a cyclopentenylcyclopentenyl halide, one isomeric form of said halide corresponding to the formula:

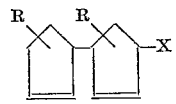

wherein R is selected from the group consisting of hydrogen and alkyl groups of from 1–8 carbon atoms and X is selected from the group consisting of chlorine and bromine with a monoepoxide of the formula:

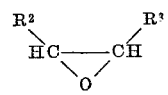

wherein $R^2$ individually is selected from the group consisting of hydrogen, alkyl of from 1–8 carbon atoms, haloalkyl groups of from 1–8 carbon atoms, vinyl and phenyl; $R^3$ individually represents hydrogen; $R^2$ and $R^3$ taken together represent alkylene groups selected from the group consisting of trimethylene and tetramethylene in contact with a Friedel-Crafts catalyst; at a temperature of from −80° to +80° C.

2. A process for the production of cyclopentenylcyclopentenyl ethers which comprises contacting a cyclopentenylcyclopentenyl halide, one isomeric form of said halide corresponding to the formula

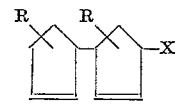

wherein R is selected from the group consisting of hydrogen and alkyl groups of from 1 to 8 carbon atoms and wherein X is selected from the group consisting of chlorine and bromine; and a 1,2-ethoxyalkane having up to 10 carbon atoms; in the presence of a Friedel-Crafts catalyst; at a temperature of from −80° to +80° C.

3. A process for the production of cyclopentenylcyclopentenyl ethers which comprises contacting a cyclopentenylcyclopentenyl halide, one isomeric form of said halide corresponding to the formula:

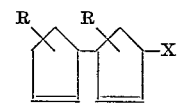

wherein R is selected from the group consisting of hydrogen and alkyl groups of from 1 to 8 carbon atoms and wherein X is selected from the group consisting of chlorine and bromine; and a halo-1,2-epoxyalkane having up to 10 carbon atoms; in the presence of a Friedel-Crafts catalyst; at a temperature of from −80° to +80° C.

4. A process for the production of cyclopentenylcyclopentenyl ethers which comprises contacting a cyclopentenylcyclopentenyl halide, one isomeric form of said halide corresponding to the formula:

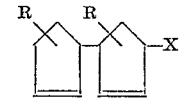

wherein R is selected from the group consisting of hydrogen and alkyl groups of from 1 to 8 carbon atoms and wherein X is selected from the group of chlorine and bromine; and ethylene oxide at a temperature of from −80° C. to +80° C., in the presence of from 0.1 to 10 percent by weight of a Friedel-Crafts catalyst.

5. A process for the production of cyclopentenylcyclopentyl ethers which comprises contacting a cyclopentenylcyclopentenyl halide, one isomeric form of said halide corresponding to the formula:

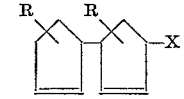

wherein R is selected from the group consisting of hydrogen and alkyl groups of from 1 to 8 carbon atoms and wherein X is selected from the group of chlorine and bromine; and propylene oxide at a temperature of from −80° C. to +80° C., in the presence of from 0.1 to 10 percent by weight of a Friedel-Crafts catalyst.

6. A process for the production of cyclopentenylcyclopentyl ethers which comprises contacting a cyclopentenylcyclopentenyl halide, one isomeric form of said halide corresponding to the formula:

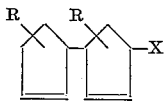

wherein R is selected from the group consisting of hydrogen and alkyl groups of from 1 to 8 carbon atoms and wherein X is selected from the group of chlorine and bromine; and styrene oxide at a temperature of from −80° C. to +80° C., in the presence of from 0.1 to 10 percent by weight of a Friedel-Crafts catalyst.

7. Di(cyclopentenyl) 2-chloroethyl ether.

References Cited by the Examiner

UNITED STATES PATENTS 2,608,586  8/1952  Ballard et al. _____ 260—614

FOREIGN PATENTS 473,997  5/1951  Canada.
672,416  5/1952  Great Britain.

OTHER REFERENCES

Bedos, Compt. Rend. (1926), vol. 183, pp. 562–565.
Thomas, Anhydrous Aluminum Chloride in Organic Chemistry (1941), page 769.

LEON ZITVER, *Primary Examiner*.

CHARLES B. PARKER, *Examiner*.